United States Patent [19]

Mori

[11] Patent Number: 5,278,597
[45] Date of Patent: Jan. 11, 1994

[54] CAMERA WITH A POSITIVE MENISCUS LENS

[75] Inventor: Nobuyoshi Mori, Hachioji, Japan
[73] Assignee: Konica Corporation, Tokyo, Japan
[21] Appl. No.: 984,831
[22] Filed: Dec. 3, 1992

[30] Foreign Application Priority Data

Dec. 26, 1991 [JP] Japan ............ 3-356749

[51] Int. Cl.$^5$ .............................. G03B 37/00
[52] U.S. Cl. ............................. 354/96
[58] Field of Search ............ 354/96, 203, 270, 274, 354/288

[56] References Cited

U.S. PATENT DOCUMENTS 4,812,866  3/1989  Ushiro et al. ............ 354/288

FOREIGN PATENT DOCUMENTS 63-199351   8/1988  Japan .
63-246713  10/1988  Japan .
2-106710    4/1990  Japan .

*Primary Examiner*—Michael L. Gellner
*Assistant Examiner*—Howard B. Blankenship
*Attorney, Agent, or Firm*—Finnegan, Henderson, Farabow, Garrett & Dunner

[57] ABSTRACT

In a camera in which a 35 mm photographic roll film is used, a positive convex meniscus lens, the convex side of which faces an object to be photographed, an aperture diaphragm and a flare-stop facing an image side are provided. An image plane is curved toward the lens as the image plane advances away from the optical axis of the lens in the longer side direction of the focal surface. The following inequalities are satisfied:

$$26 \leq f \leq 32$$

$$f^2/126 \leq F \leq 16$$

in which f represents the focal distance and F represents the F-number of the lens.

35 Claims, 10 Drawing Sheets

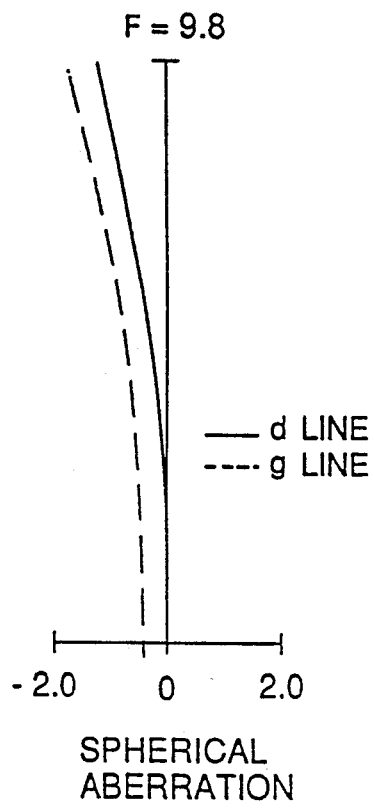
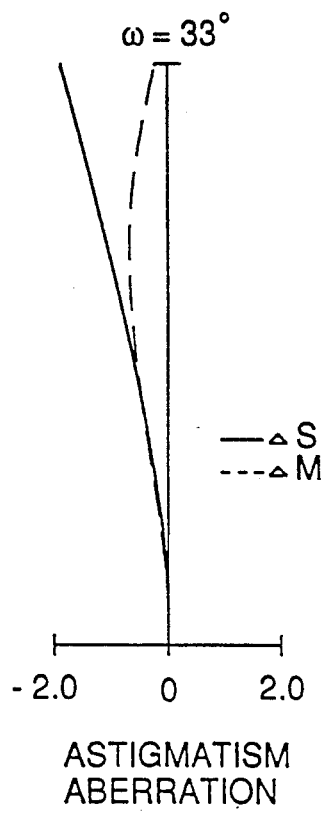
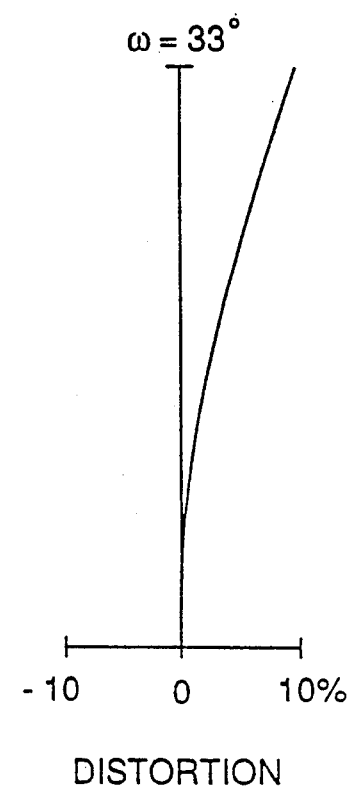
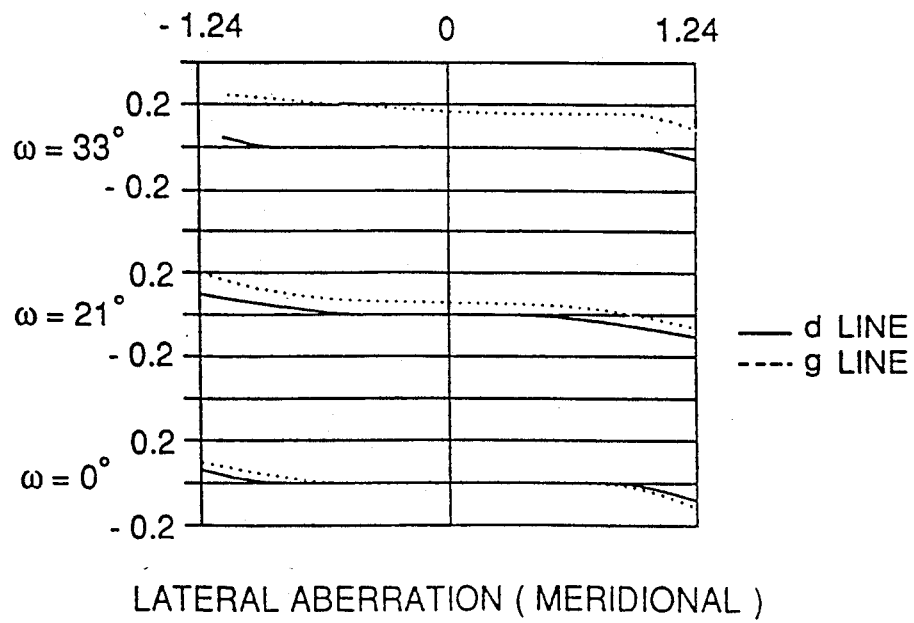

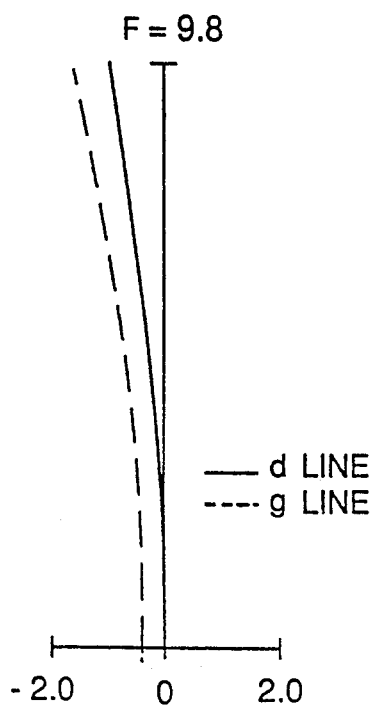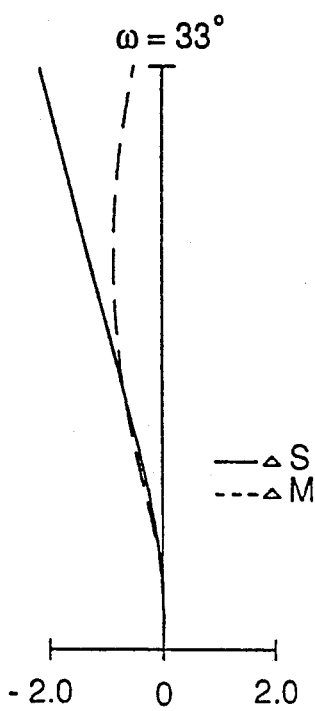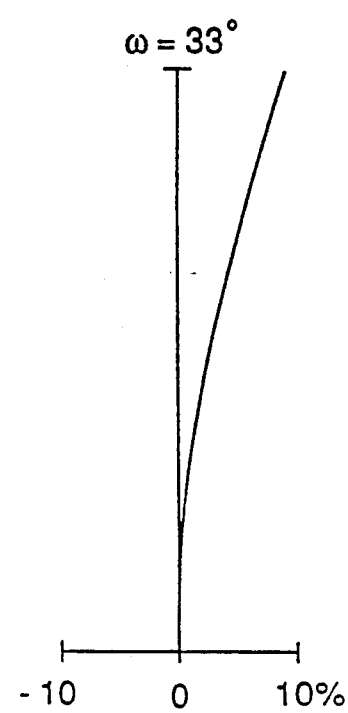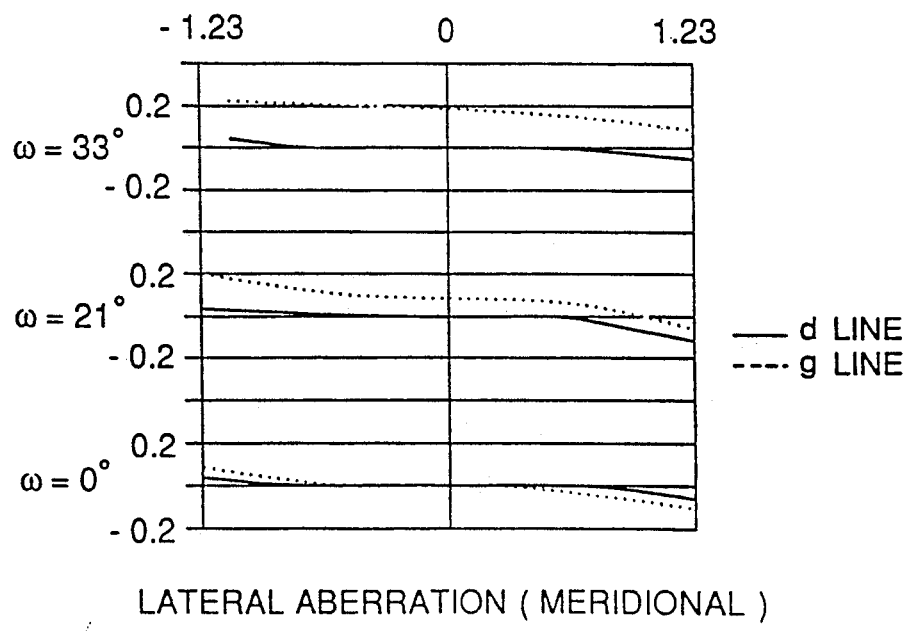

SPHERICAL ABERRATION

ASTIGMATISM ABERRATION

DISTORTION

LATERAL ABERRATION ( MERIDIONAL )

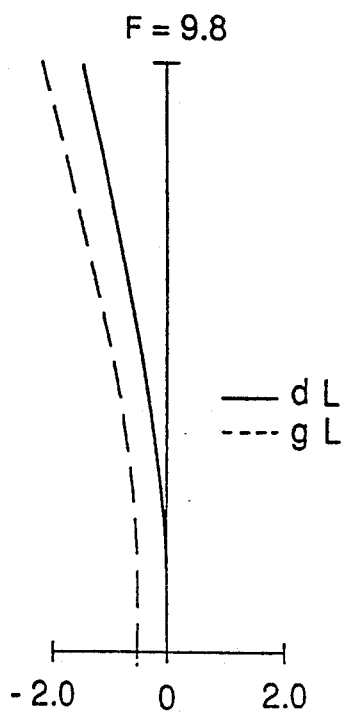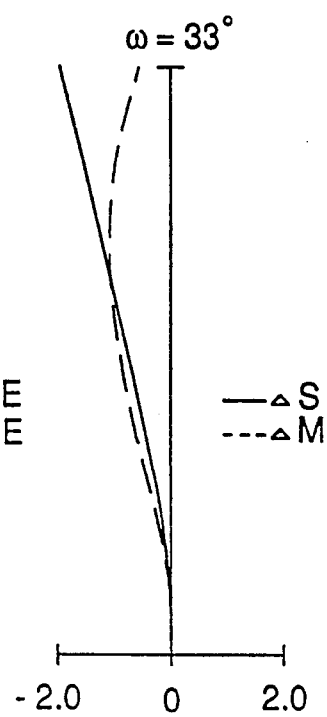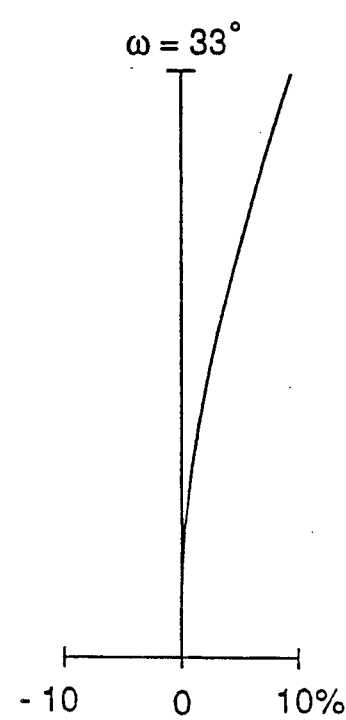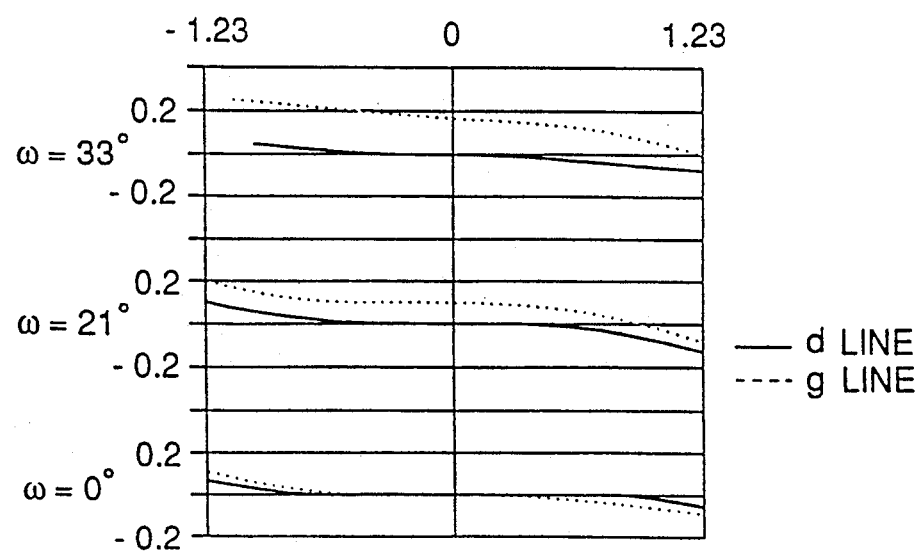
FIG. 5D

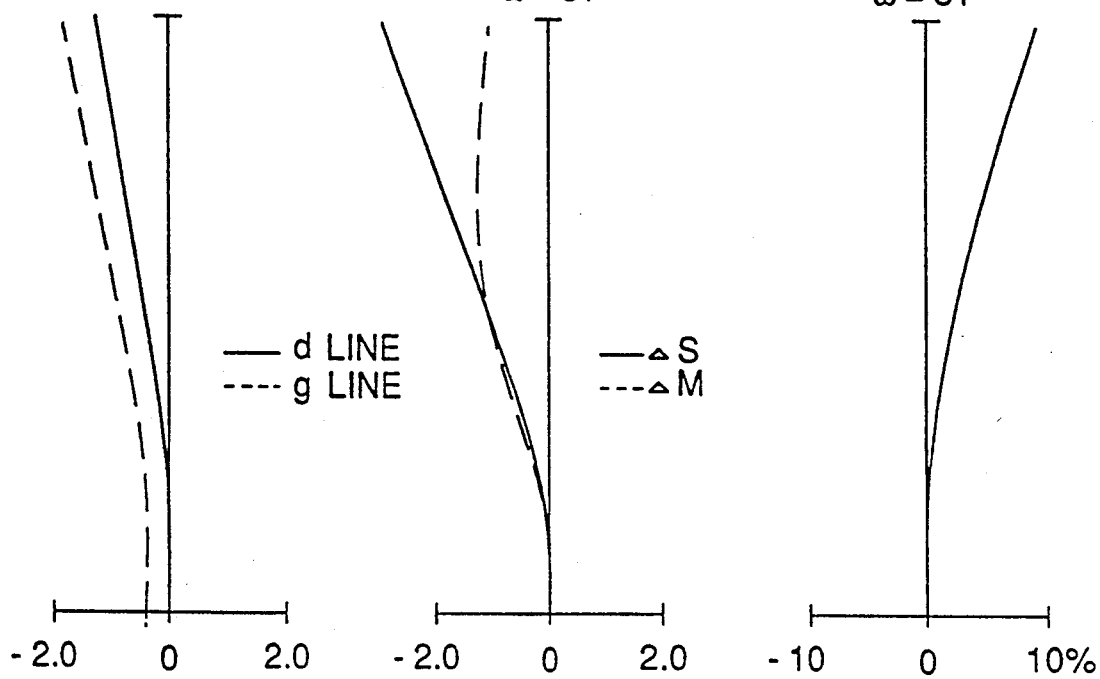

F = 11.0

— d LINE
--- g LINE

SPHERICAL
ABERRATION

ω = 34°

—△S
---△M

ASTIGMATISM
ABERRATION

ω = 34°

DISTORTION

LATERAL ABERRATION ( MERIDIONAL )

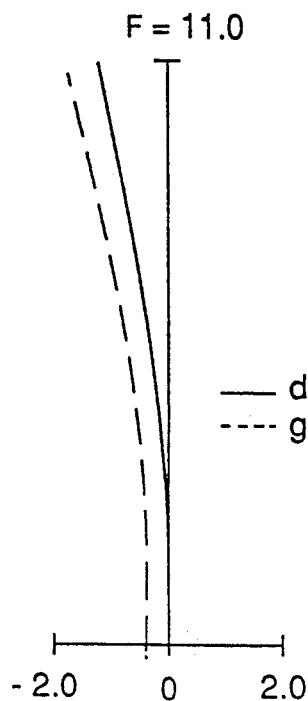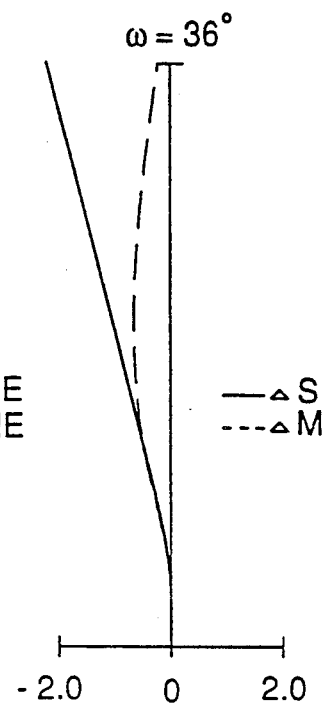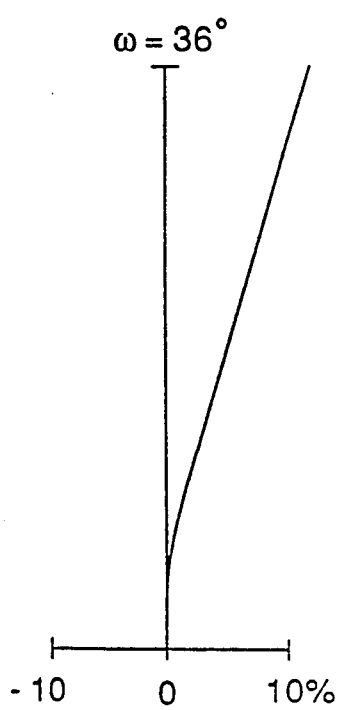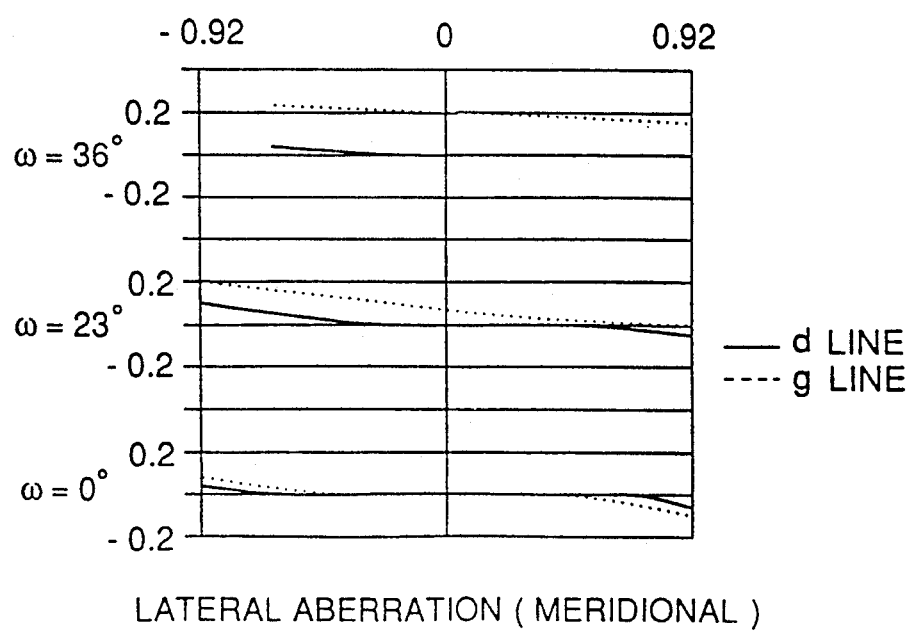

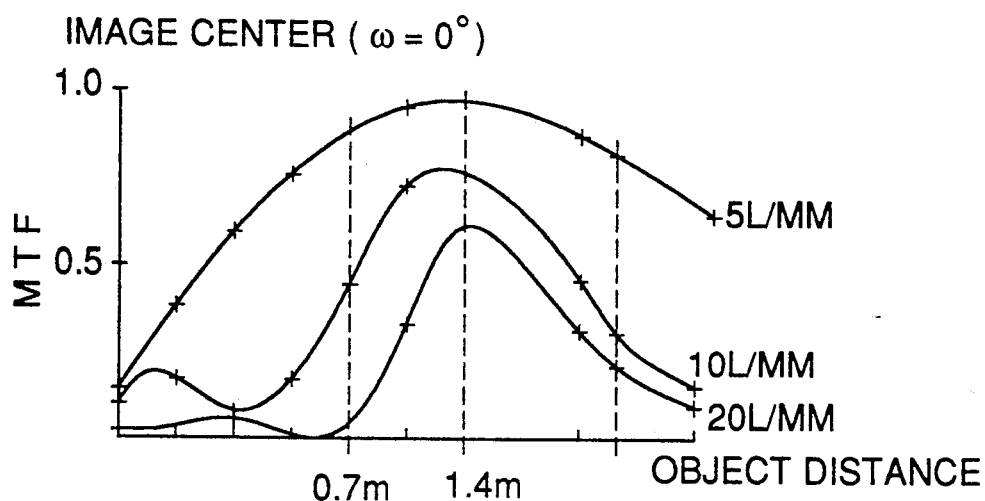
FIG. 9(A) IMAGE CENTER ($\omega = 0°$)
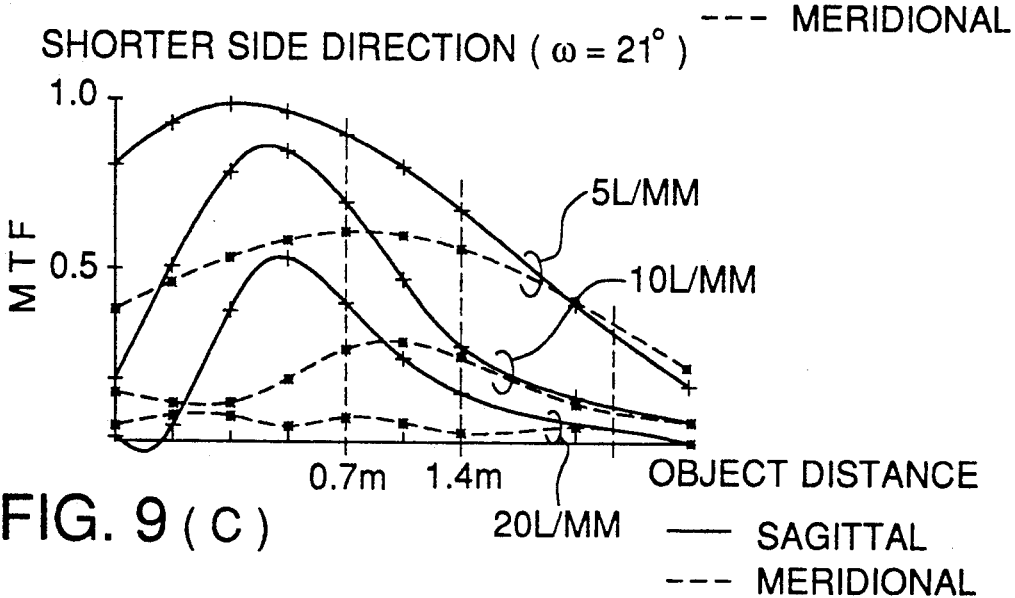
FIG. 9(B) SHORTER SIDE DIRECTION ($\omega = 21°$)
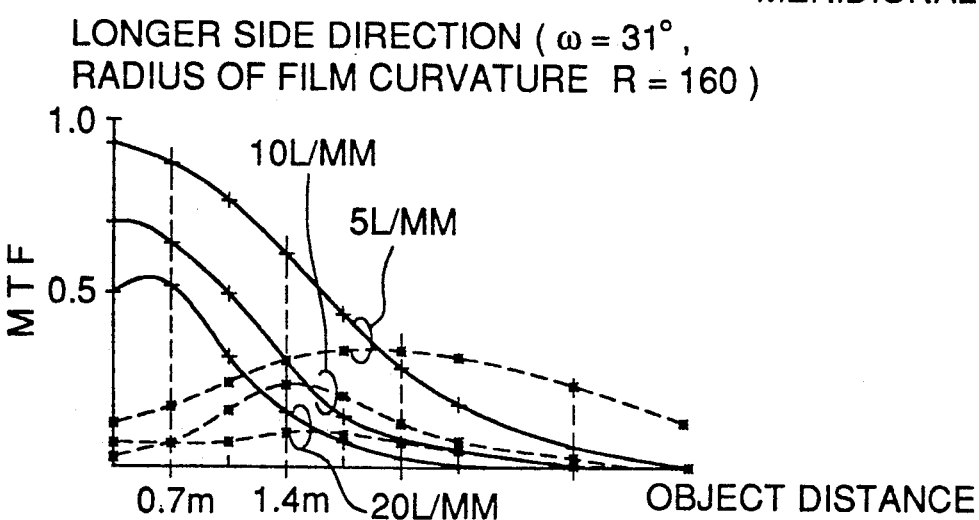
FIG. 9(C) LONGER SIDE DIRECTION ($\omega = 31°$, RADIUS OF FILM CURVATURE $R = 160$)

CAMERA WITH A POSITIVE MENISCUS LENS

BACKGROUND OF THE INVENTION

The present invention relates to a compact fixed focus type camera or a lens unit having a film, and more particularly relates to a lens that is assembled to the camera or the lens unit.

Conventionally, a 35 mm-roll-film unit having a lens or a fixed focus type camera having a simple structure is provided with a lens, the focal distance of which is approximately 35 mm. The single lens applied to the aforementioned 35 mm-roll-film unit or fixed focus type camera is disclosed in Japanese Patent Application Open to Public Inspection Nos. 199351/1988, 246713/1988 and 106710/1990. In these patent applications, examples are disclosed in which an aspherical lens or a spherical lens, the focal distance of which is 33 to 50 mm, is combined with a diaphragm.

However, as the focal distance is 33 to 50 mm in the aforementioned examples, the total length of the lens and diaphragm is not less than 30 mm. Therefore, the depth of the cameras and film units (referred to as a camera, hereinafter) available on the market are not less than 35 mm, so that it is not easy to carry the cameras in a pocket. Recently, panoramic cameras have become popular, and wide-angle lenses by which an object and a background can both be photographed are widely used. For that reason, a simple camera provided with a wide picture-taking lens, the angle of which is larger than 35 mm, is required.

SUMMARY OF THE INVENTION

It is an object of the present invention to provide a single lens for picture-taking appropriate for a handy camera system, the depth of which is not more than 35 mm, and also to provide a camera system by which an image of high quality can be obtained although the focal distance is reduced to obtain a wide-angle.

The present invention is to provide a picture-taking lens including a positive meniscus lens, convex on the object side, and at least one diaphragm provided on the image side, wherein an image is formed by the positive meniscus lens on a 35 mm roll film surface that is concavely curved on the side facing the lens with regard to the direction of the long side of the image, the profile of said meniscus lens satisfying the following inequalities:

$$26 \leq f \leq 32 \quad (1)$$

$$f^2/126 \leq F \leq 16 \quad (2)$$

where the focal distance of said meniscus lens is f, and the F-number is F.

More particularly, the profile of said lens satisfies the following inequality:

$$1.5 \leq \beta \leq 1.8 \quad (3)$$

where the paraxial lateral magnification of the first lens surface is $\beta$.

Further, the profile of said lens satisfies the following inequality:

$$\tfrac{1}{4}(0.8 \cdot h_{max})^2 \cdot (P - F/700) \leq \Delta(0.8 \cdot h_{max}) \leq 1.3 \quad (4)$$

where the displacement amount of the curved film surface from the plane is $\Delta$ at a position located by distance h perpendicular to the optical axis of the lens with regard to the direction of the long side of the image. In this case, P is Petzval's sum of the lens, F is the F-number, and $h_{max}$ is the maximum distance of the image from the optical axis with respect to the direction of the long side of the image.

A specific profile to satisfy the aforementioned condition (4) is as follows:

When the curved film surface is a portion of a cylindrical surface, the radius of curvature of which is R, the following inequality is satisfied:

$$80 \leq R \leq (P - F/700)^{-1} \quad (5)$$

The diaphragm is disposed so that the following inequality can be satisfied:

$$0.12f < X < 0.18f \quad (6)$$

where the distance from the first lens surface to the aperture diaphragm on the side that is closest to the image, is defined as X. Further, a diaphragm to restrict the off-axis light flux is provided between the aperture diaphragm and the lens.

Preferably, the following inequalities are satisfied:

$$1.45 \leq n \leq 1.65 \quad (7)$$

$$50 \leq \nu d \quad (8)$$

where the refractive index of the aforementioned positive meniscus lens is n, and the Abbe's number is $\nu d$.

When the lens is formed in the profile of a convex meniscus and the diaphragm is disposed behind the lens, the lens astigmatism can be reduced, and the image surface can be brought close to Petzval's image surface. This Petzval's image surface is formed in such a manner that: the image surface is curved to the lens side more at the sides thereof than at the center thereof. When the film surface is curved to the lens side in the aforementioned manner, deterioration of the image can be prevented even if the film surface is curved.

Next, the aforementioned inequalities will be explained as follows.

When the focal distance exceeds the upper limit shown in condition (1), the total lens length is extended, so that it is difficult to provide a handy camera.

When the focal distance exceeds the lower limit shown in the condition (1), the amount of curvature of the image surface is increased too much. Therefore, even when the film surface is curved in the aforementioned manner, a large difference is caused between the image quality of the short side direction and that of the long side direction. Further, coma aberration, astigmatism aberration, chromatic aberration, and distortion are increased, so that the image quality of the periphery is remarkably deteriorated.

The condition (2) is established to obtain a fixed focus camera that can provide an image of high quality. When the F-number exceeds the upper limit of condition (2), the amount of light tends to be insufficient when a photograph is taken in a room or in cloudy weather, so that an image of an appropriate exposure amount can not be provided.

The condition (2) is established to obtain an appropriate depth of field.

In general, when the F number of a lens is F, the focal distance is f, and the diameter of a circle of confusion is $\epsilon$, hyper focal distance $U_0$ can be expressed by the following equation. When the focus is adjusted to a subject, the distance of which is $U_0$, an image, which is in focus from the closest distance $U_0/2$ to infinite, can be obtained.

$$U_0 = f^2/F\epsilon$$

In the case where a 35 mm roll film is enlarged to a print of service size, the allowable value of diameter $\epsilon$ of the circule of confusion is probably 0.07, and when the closest distance $U_0/2$ is set at not more than 0.9 m, the following inequality can be obtained.

$$f^2/(2 \times 0.07 \times F) \leq 900$$

As a result of the foregoing, the lower limit of condition (2) can be obtained. That is, when the F-number exceeds the lower limit of condition (2), the focusing range is reduced, and further image quality is deteriorated by spherical aberration.

When the paraxial lateral magnification $\beta$ exceeds the upper limit of condition (3), spherical aberration, on-axis chromatic aberration, and magnification chromatic aberration are increased. When they exceed the lower limit, the Petzval's sum is increased, and as a result, the lens length is increased.

The condition (4) restricts the amount of curvature of the film surface. When the amount of curvature exceeds the upper limit of condition (4), the difference between the image quality of the long side direction and that of the short side direction is increased. When the amount of curvature exceeds the lower limit of condition (4), the amount of curvature of the film surface is insufficient, so that the image quality is deteriorated in the periphery of the long side direction of the image screen.

When radius R of curvature of the curved film surface exceeds the upper limit of condition (5), the amount of curvature of the film surface becomes insufficient with respect to the curvature of the image surface. Therefore, the film surface is insufficient, so that the image quality is deteriorated in the periphery of the long side direction of the image screen.

When radius R of curvature of the curved film surface exceeds the lower limit of condition (5), the difference between the image quality of the long side direction of the image screen and that of the short side is increased, and further the film can not be fed smoothly.

The condition (6) is established for coma aberration and magnification chromatic aberration. When distance X exceeds the upper limit, the magnification chromatic aberration is increased, and when distance X exceeds the lower limit, introversive coma aberration is increased.

When refractive index n exceeds the upper limit of condition (7), the material cost of glass is increased, and further it becomes difficult to grind the lens. As a result, the cost is further increased. When refractive index n exceeds the lower limit of condition (7), it is not desirable because the spherical aberration is increased.

When the Abbe's number $\nu d$ exceeds the lower limit of condition (8), the chromatic aberration, and especially the magnification chromatic aberration is increased, and it is not desirable because the periphery of the image is colored.

BRIEF DESCRIPTION OF THE DRAWINGS

FIGS. 2A, 2B, 2C, and 2D are views showing the aberration of the first example of the lens of the present invention;

FIGS. 3A, 3B, 3C, and 3D are views showing the aberration of the second example of the lens of the present invention;

FIGS. 5A, 5B, 5C, and 5D are views showing the aberration of the fourth example of the lens of the present invention;

FIGS. 6A, 6B, 6C, and 6D are views showing the aberration of the fifth example of the lens of the present invention;

FIGS. 8A, 8B, 8C, and 8D are views showing the aberration of the seventh example of the lens of the present invention;

FIGS. 9(A), 9(B) and 9(C) are an MTF diagram of the fourth example; and

DETAILED DESCRIPTION OF THE PREFERRED EMBODIMENT

Examples of the present invention are shown as follows. Characters in the tables are defined as follows.

r: radius of curvature of the refractive surface
R: radius of curvature of the film surface
d: interval of the refractive surfaces
nd: refractive index of the lens material
$\nu d$: Abbe's number
F: F-number
$\omega$: half angle of view

| First Example | | | | |
|---|---|---|---|---|
| f = 30.0 | F = 9.8 | | $\omega = 33°$ | |
| Surface | r | d | nd | $\nu d$ |
| 1 | 5.820 | 1.90 | 1.492 | 57 |
| 2 | 8.574 | 1.60 | | |
| 3 | FLARE STOP ($\phi$3.8) | 1.00 | | |
| 4 | Aperture Diaphragm ($\phi$2.47) | | | |
| $\beta = 1.7$ | | R = 160 | X/f = 0.15 | |
| Total Lens Length = 28.7 | | | P = 0.0182 | |

| Second Example | | | | |
|---|---|---|---|---|
| f = 30.0 | F = 9.8 | | $\omega = 33°$ | |
| Surface | r | d | nd | $\nu d$ |
| 1 | 6.000 | 2.00 | 1.492 | 57 |
| 2 | 8.998 | 1.70 | | |
| 3 | FLARE STOP ($\phi$3.7) | 1.00 | | |
| 4 | Aperture Diaphragm ($\phi$2.45) | | | |
| $\beta = 1.65$ | | R = 160 | X/f = 0.157 | |
| Total Lens Length = 28.7 | | | P = 0.0183 | |

| Third Example | | | | |
|---|---|---|---|---|
| f = 30.0 | F = 9.8 | | $\omega = 33°$ | |
| Surface | r | d | nd | $\nu d$ |
| 1 | 6.266 | 2.00 | 1.492 | 57 |
| 2 | 9.742 | 1.90 | | |
| 3 | FLARE STOP ($\phi$3.7) | 1.00 | | |
| 4 | Aperture Diaphragm ($\phi$2.44) | | | |
| $\beta = 1.58$ | | R = 110 | X/f = 0.163 | |
| Total Lens Length = 28.8 | | | P = 0.0188 | |

| Fourth Example | | | | |
|---|---|---|---|---|
| f = 30.0 | F = 9.8 | | $\omega = 33°$ | |
| Surface | r | d | nd | $\nu d$ |

-continued

| 1 | 6.092 | | 1.90 | 1.492 | 57 |
|---|---|---|---|---|---|
| 2 | 9.304 | | 1.80 | | |
| 3 | FLARE STOP (φ3.8) | | 1.00 | | |
| 4 | Aperture Diaphragm (φ2.47) | | | | |

β = 1.62   R = 160   X/f = 0.157
Total Lens Length = 28.8   P = 0.0187

Fifth Example
f = 32.0   F = 9.8   ω = 31°

| Surface | r | d | nd | νd |
|---|---|---|---|---|
| 1 | 6.684 | 2.00 | 1.492 | 57 |
| 2 | 10.468 | 2.30 | | |
| 3 | FLARE STOP (φ3.4) | 1.00 | | |
| 4 | Aperture Diaphragm (φ2.61) | | | |

β = 1.58   R = 200   X/f = 0.166
Total Lens Length = 30.8   P = 0.0178

Sixth Example
f = 28.0   F = 11.0   ω = 34°

| Surface | r | d | nd | νd |
|---|---|---|---|---|
| 1 | 5.770 | 1.80 | 1.492 | 57 |
| 2 | 8.907 | 1.70 | | |
| 3 | FLARE STOP (φ3.2) | 1.00 | | |
| 4 | Aperture Diaphragm (φ2.04) | | | |

β = 1.60   R = 110   X/f = 0.161
Total Lens Length = 26.9   P = 0.0201

Seventh Example
f = 26.0   F = 11.0   ω = 36°

| Surface | r | d | nd | νd |
|---|---|---|---|---|
| 1 | 5.196 | 1.80 | 1.492 | 57 |
| 2 | 7.751 | 1.70 | | |
| 3 | FLARE STOP (φ3.2) | 1.00 | | |
| 4 | Aperture Diaphragm (φ1.85) | | | |

β = 1.65   R = 100   X/f = 0.173
Total Lens Length = 24.8   P = 0.0209

Figure 1:
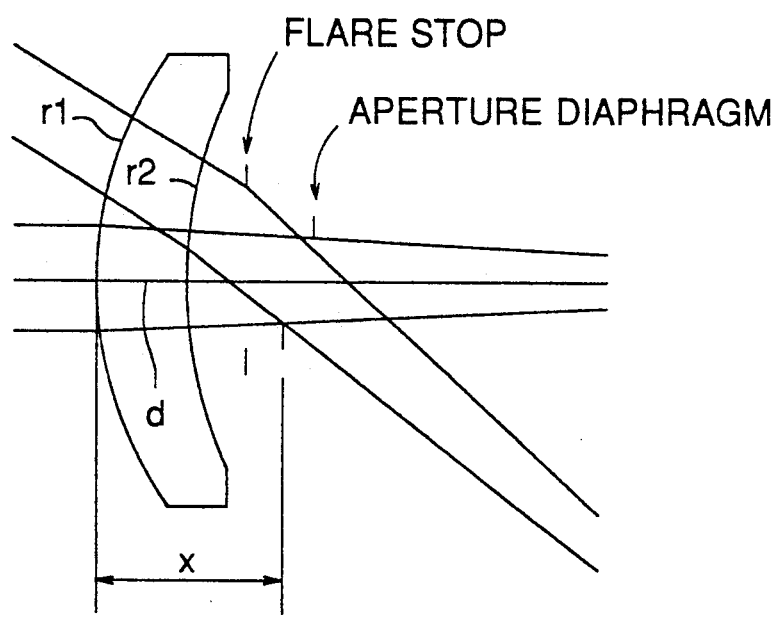
FIG. 1 is a sectional view of the picture-taking lens of the camera of the present invention.
Figure 4A:
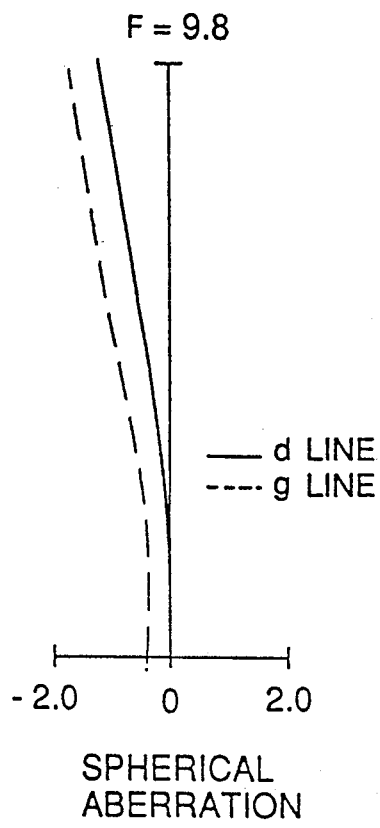
FIGS. 4A, 4B, 4C, and 4D are views showing the aberration of the third example of the lens of the present invention.
Figure 4B:
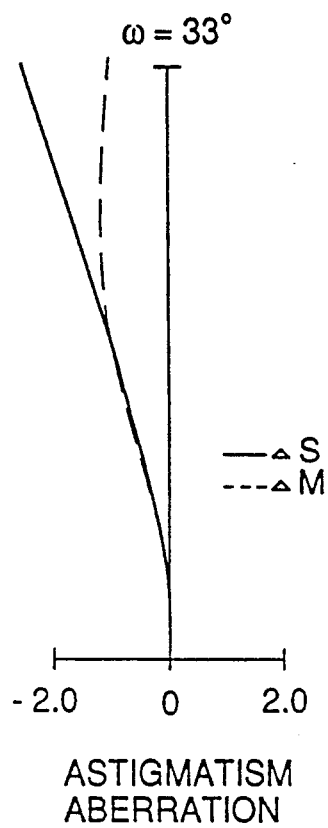
Figure 4C:
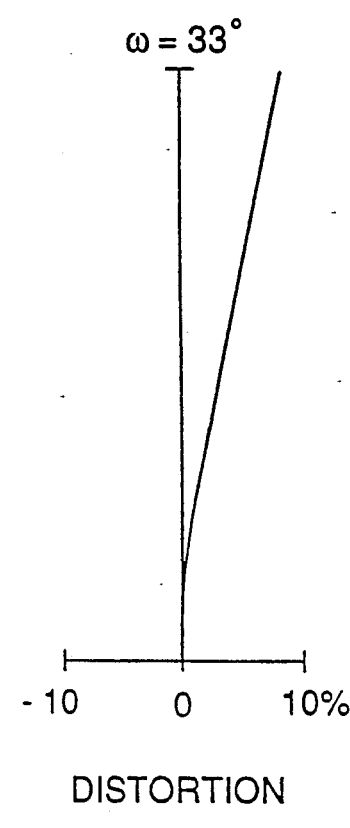
Figure 4D:
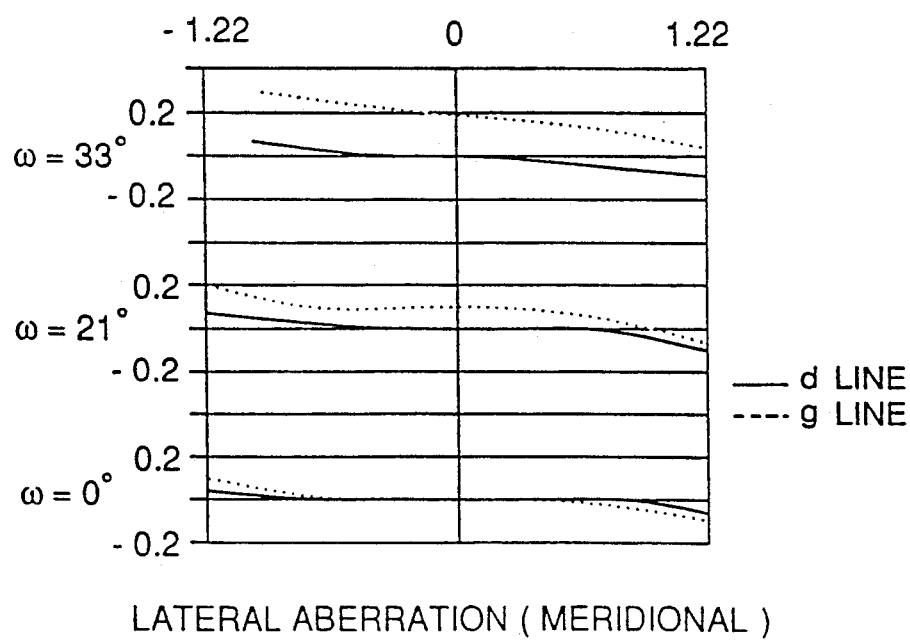
Figure 7A:
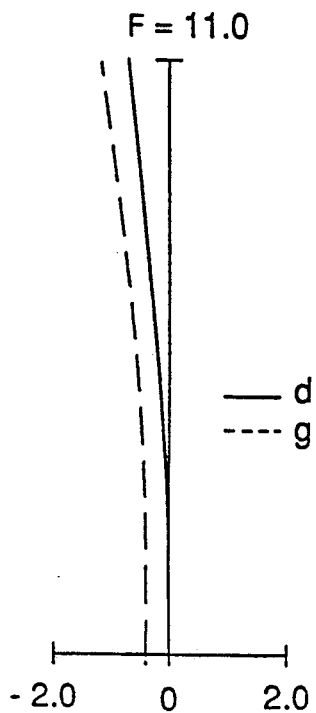
FIGS. 7A, 7B, 7C, and 7D are views showing the aberration of the sixth example of the lens of the present invention.
Figure 7B:
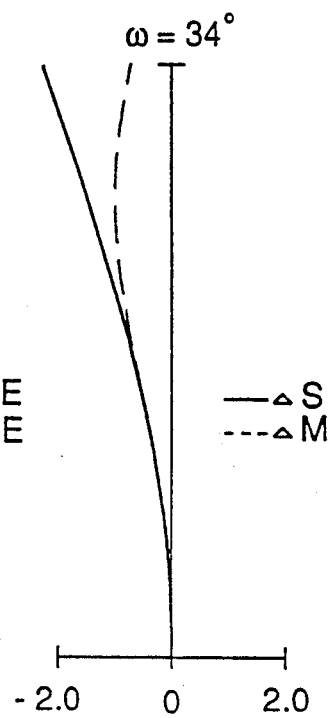
Figure 7C:
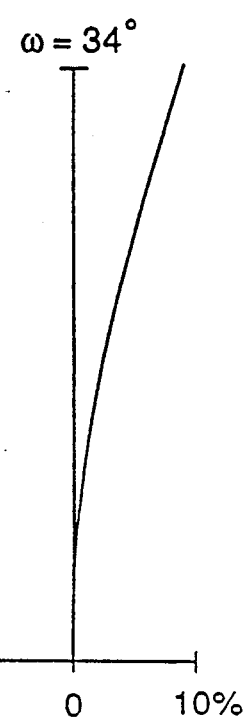
Figure 7D:
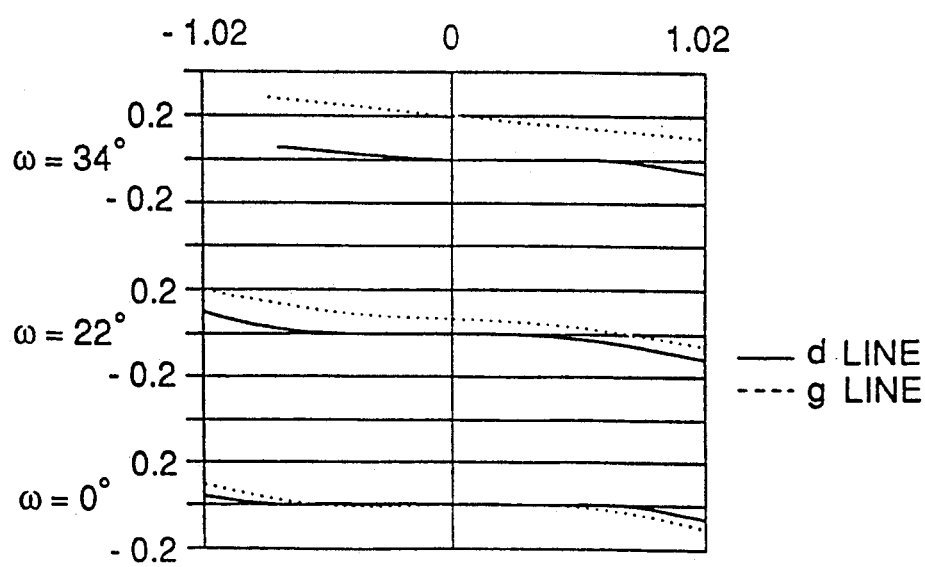
Figure 10:
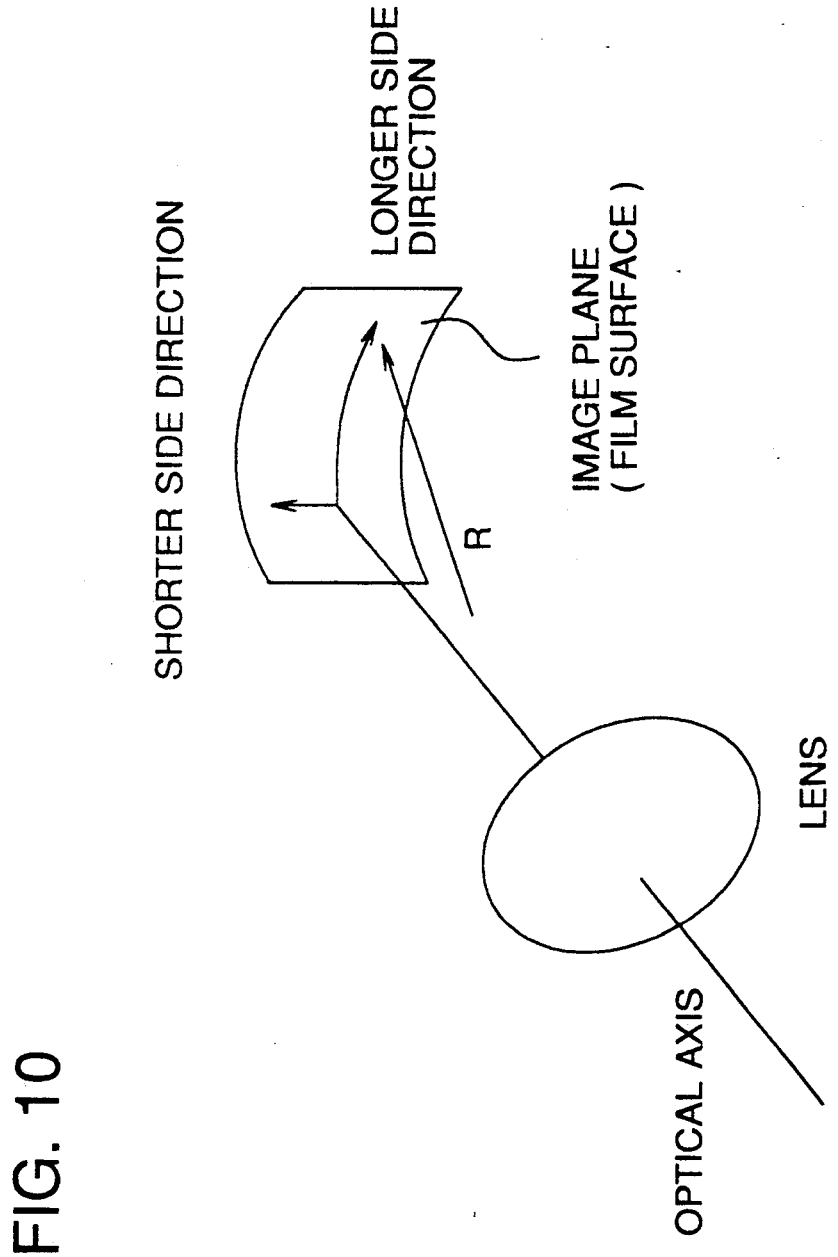
FIG. 10 is a schematic illustration for explaining the arrangement of the picture-taking lens and the image screen of the camera of the present invention.

Aberration curves of the aforementioned examples are shown in FIGS. 2 to 8. FIG. 9 is an MTF diagram of the fourth example. For simplification, the aberration curves have been made under the condition that the film surface is not curved.

Although plastic lenses are used in the examples, glass lenses may be used.

As shown in the examples, the picture-taking lens of the present invention is the total length is short, so that it is suitable for a handy camera. The picture-taking lens is provided with a wide angle and an appropriate F-number so that the depth of field is large. When a film surface is appropriately curved, a object located not only at a close position but also at a far position can be photographed in a wide angle and obtain high quality. Therefore, the present invention can provide a camera system meeting the demand of users who want to take snapshots.

What is claimed is:

1. A camera for use with a 35 mm photographic roll film, comprising:
   (a) a positive convex meniscus lens, a convex face of said lens facing an object to be photographed;
   (b) a diaphragm composed of at least one blade, said diaphragm being positioned between said lens and an image; and
   (c) an image plane on which the image is formed, said image plane being formed on a surface portion of the film when installed in said camera, said image plane being curved along a direction corresponding to a longer side of said image plane,
   wherein the following inequalities are satisfied:

$$26 \leq f \leq 32$$

$$f^2/126 \leq F \leq 16$$

in which f represents the focal distance and F represents the F-number of said lens.

2. The camera of claim 1 wherein a paraxial lateral magnification of the convex face is β, the following inequalities are satisified:

$$1.5 \leq \beta \leq 1.8.$$

3. The camera of claim 1 wherein when said image plane is part of a surface of a cylinder with a radius R, and Petzval's sum of said lens is P, the following inequality is satisfied:

$$80 \leq R \leq (P - F/700)^{-1}.$$

4. The camera of claim 1 wherein when a displacement amount of the image plane on the optical axis at a position where distance h from the optical axis in the longer side direction of said image plane is Δ, the following inequality is satisified:

$$\tfrac{1}{2}(0.8 \cdot h\ max)^2 \cdot (P - F/700) \leq \Delta(0.8 \cdot h\ max) \leq 1.3$$

in which P represents Petzval's sum, F represents the F-number and h max represents the maximum distance of said curved image plane from the optical axis in the longer side direction.

5. The camera of claim 1 wherein when a distance between a first refractive surface and a second refractive surface of said lens on the optical axis is $d_1$, the following inequality is satisfied:

$$d_1 \leq 2.00.$$

6. The camera of claim 2 wherein when said image plane is part of a surface of a cylinder with a radius R, and Petzval's sum of said lens is P, the following inequality is satisfied:

$$80 \leq R \leq (P - F/700)^{-1}.$$

7. The camera of claim 6 wherein when a distance between a first refractive surface and a second refractive surface of said lens on the optical axis is $d_1$, the following inequality is satisfied:

$$d_1 \leq 2.00.$$

8. The camera of claim 7 wherein when a distance between said convex face of said lens and said diaphragm on the optical axis is X, the following inequality is satisfied:

$$0.12f < X < 0.18f.$$

9. The camera of claim 8 further comprising a flare-stop for restricting an off-axial luminous flux, wherein said flare-stop is provided between said diaphragm and said lens.

10. The camera of claim 2 wherein when a displacement amount of the image plane on the optical axis at a position where distance h from the optical axis in the longer side direction of said image plane is Δ, the following inequality is satisfied:

$$\tfrac{1}{2}(0.8 \cdot h\ max)^2 \cdot (P - F/700) \leq \Delta(0.8 \cdot h\ max) \leq 1.3$$

in which P represents Petzval's sum, F represents the F-number and h max represents the maximum distance of said curved image plane from the optical axis in the longer side direction.

11. The camera of claim 10 wherein when a distance between a first refractive surface and a second refractive surface of said lens on the optical axis is $d_1$, the following is satisfied:

$d_1 \leq 2.00$.

12. The camera of claim 11 wherein when a distance between said convex face of said lens and said diaphragm on the optical axis is X, the following inequality is satisfied:

$0.12f < X < 0.18f$.

13. The camera of claim 12 further comprising a flare-stop for restricting an off-axial luminous flux, wherein said flare-stop is provided between said diaphragm and said lens.

14. The camera of claim 2 wherein when a distance between a first refractive surface and a second refractive surface of said lens on the optical axis is $d_1$, the following inequality is satisfied:

$d_1 \leq 2.00$.

15. The camera of claim 14 wherein when a distance between said convex face of said lens and said diaphragm on the optical axis is X, the following inequality is satisfied:

$0.12f < X < 0.18f$.

16. The camera of claim 15 further comprising a flare-stop for restricting an off-axial luminous flux, wherein said flare-stop is provided between said diaphragm and said lens.

17. The camera of claim 3 wherein when a distance between a first refractive surface and a second refractive surface of said lens on the optical axis is $d_1$, the following inequality is satisfied:

$d_1 \leq 2.00$.

18. The camera of claim 17 wherein when a distance between said convex face of said lens and said diaphragm on the optical axis is X, the following inequality is satisfied:

$0.12f < X < 0.18f$.

19. The camera of claim 18 further comprising a flare-stop for restricting an off-axial luminous flux, wherein said flare-stop is provided between said diaphragm and said lens.

20. The camera of claim 3 wherein said camera is a single use camera.

21. The camera of claim 20 wherein when a distance between a first refractive surface and a second refractive surface of said lens on the optical axis is $d_1$, the following inequality is satisfied:

$d_1 \leq 2.00$.

22. The camera of claim 21 wherein when a distance between said convex face of said lens and said diaphragm on the optical axis is X, the following inequality is satisfied:

$0.12f < X < 0.18f$.

23. The camera of claim 22 further comprising a flare-stop for restricting an off-axial luminous flux, wherein said flare-stop is provided between said diaphragm and said lens.

24. The camera of claim 4 wherein when a distance between a first refractive surface and a second refractive surface of said lens on the optical axis is $d_1$, the following inequality is satisfied:

$d_1 \leq 2.00$.

25. The camera of claim 24 wherein when a distance between said convex face of said lens and said diaphragm on the optical axis is X, the following inequality is satisfied:

$0.12f < X < 0.18f$.

26. The camera of claim 25 further comprising a flare-stop for restricting an off-axial luminous flux, wherein said flare-stop is provided between said diaphragm and said lens.

27. The camera of claim 4 wherein said camera is a single use camera.

28. The camera of claim 27 wherein when a distance between a first refractive surface and a second refractive surface of said lens on the optical axis is $d_1$, the following inequality is satisfied:

$d_1 \leq 2.00$.

29. The camera of claim 28 wherein when a distance between said convex face of said lens and said diaphragm on the optical axis is X, the following inequality is satisfied:

$0.12f < X < 0.18f$.

30. The camera of claim 29 further comprising a flare-stop for restricting an off-axial luminous flux, wherein said flare-stop is provided between said diaphragm and said lens.

31. The camera of claim 5 wherein when a distance between said convex face of said lens and said diaphragm on the optical axis is X, the following inequality is satisfied:

$0.12f < X < 0.18f$.

32. The camera of claim 31 further comprising a flare-stop for restricting an off-axial luminous flux, wherein said flare-stop is provided between said diaphragm and said lens.

33. The camera of claim 5 wherein said camera is a single use camera.

34. The claim of claim 33 wherein when a distance between said convex face of said lens and said diaphragm on the optical axis is X, the following inequality is satisfied:

$0.12f < X < 0.18f$.

35. The camera of claim 34 further comprising a flare-stop for restricting an off-axial luminous flux, wherein said flare-stop is provided between said diaphragm and said lens.

* * * * *